United States Patent [19]

Nilsson

[11] 4,071,946

[45] Feb. 7, 1978

[54] PRODUCTION OF LEAD POWDER FOR TUBE ELECTRODES

[75] Inventor: Ove Nilsson, Nol, Sweden

[73] Assignee: Aktiebolaget Tudor, Sundbyberg, Sweden

[21] Appl. No.: 751,886

[22] Filed: Dec. 17, 1976

[30] Foreign Application Priority Data

Dec. 29, 1975 Sweden .............................. 7514664

[51] Int. Cl.² ............................................. H01M 4/04
[52] U.S. Cl. .................................. 29/623.1; 429/140; 429/217; 429/238
[58] Field of Search ............... 29/623.1; 429/212, 217, 429/140, 141, 238

[56] References Cited

U.S. PATENT DOCUMENTS 3,060,254  10/1962  Urry ...................................... 429/217
3,194,684  7/1965   Wells .................................... 429/140
4,025,701  5/1977   Sundberg ............................. 429/140

Primary Examiner—Carl E. Hall
Attorney, Agent, or Firm—Burns, Doane, Swecker & Mathis

[57] ABSTRACT

An improvement in the preparation of dry lead powder mixtures for the production of tube electrodes for lead storage batteries to reduce the dust binding problem during filling of the tube electrodes is disclosed. A small amount (0.1 to 3 weight percent) of polytetrafluoroethylene (PTFE) is mixed with the lead powder, the mixture is heated and shear stresses are applied thereto sufficient to convert substantially all of the PTFE in the mixture to fibrous form. The resulting mixture can be utilized in a dry powder process for the filling of tube electrodes with a substantial reduction or elimination of the dust binding problem.

2 Claims, No Drawings

PRODUCTION OF LEAD POWDER FOR TUBE ELECTRODES

BACKGROUND OF THE INVENTION

The present invention concerns the production of lead powder for the dry filling of tube electrodes for storage batteries.

Tube electrodes for lead storage batteries are known and have been described, for example, in U.S. Pat. No. 2,747,007. They are constructed from a grid of lead or a lead alloy, which grid contains a so-called top frame, from which extends a number of conducting bars or rods, generally of the same lead composition as the grid. Each rod is surrounded by active material and a tubular sheath of inactive porous material. The active material of fully charged positive electrodes consists of lead dioxide. In the production of the electrodes, the tube sheaths are set on the grid which is then turned upside-down on the top frame and thereafter the active material, which is provided in the form of so-called lead powder, is charged into the sheaths. The lead powder used in filling the sheaths is lead powder of varying degrees of oxidation and generally from about 70 up to 100% oxidation. The filling proceeds as follows: the electrode with the sheaths set about the rods is set up in a cassette which at the top is provided with a small-sized funnel. Thereupon, the cassette is vibrated and the lead powder which is to be conveyed to the electrode is filled down in the funnel and through the funnel into the space between the sheath and the rod. Finally, the electrode is closed with a bottom strip which covers all the tube apertures.

The dust binding of the lead powder which arises in connection with the production of tube electrodes according to the above process is very inconvenient and causes great problems. It is therefore very important that the dust binding be avoided or be reduced to a minimum. In order to reduce or eliminate dust binding, various filling methods which utilize wet mass mixtures have been tried. For example, a mass of the lead dust and water and/or other additions in small amounts may be prepared. This mass is then conveyed to an extruder or some similar feeding device and is pressed into the tube sheaths. Such a procedure is described, for example, in Swedish patent application No. 7408864. While this wet process reduces the dust binding, it produces other problems such as the formation of an irregular filling of the electrodes and increased amounts of lead in the waste water.

Polytetrafluoroethylene (PTFE) is also used for dust binding purposes not connected with the production of electrodes. In such a process, up to two percent in weight of PTFE are added to the dust-bonding powder. PTFE is present either as a dry powder or in suspension. The mixture is then heated to a temperature preferably just under 100° C and is processed. Thereby the PTFE changes from a powder to fibers.

In connection with the production of lead accumulator electrodes in the dry powder process described above, various additions to the lead dust have been attempted for different purposes. Silicon dioxide and sodium sulphate are examples of such additions. These additions, however, have had negative effects on the life span of the electrodes.

OBJECTS AND SUMMARY OF THE INVENTION

It is an object of this invention to avoid or alleviate the above-noted problems of the prior art.

It is also an object of this invention to provide a method of forming a dry lead powder mixture suitable for the filling of tube electrodes which eliminates or substantially reduces the problems of dust binding and the resulting dry lead powder mixture.

Thus, the present invention is a method for the production of lead powder suitable for the dry filling of tube electrodes for electrical accumulators comprising forming a mixture of lead powder which normally is at least 70% oxidized and from 0.1 to 3 percent by weight of polytetrafluoroethylene, heating the mixture and applying shear stresses to said powder mixture sufficient to convert a substantial portion of said polytetrafluoroethylene into fibrous form. In other aspects, the present invention also provides the dry lead powder mixture produced by this mixture and a method of filling tube sheaths in lead storage batteries utilizing the dry lead powder mixture produced by the invention.

Suprisingly, it has now been discovered that the application of PTFE in connection with lead dust for tube electrodes does not have a negative effect on the duration or life of the tube electrodes. In other respects, too, no unfavorable effects on the qualities of the electrodes have been observed.

DESCRIPTION OF THE PREFERRED EMBODIMENTS

The lead powder utilized in the dry powder mixture of this invention can be any of the conventional lead powders normally used in the dry powder production of tube electrodes for lead storage batteries having varying degrees of oxidation, generally from about 70 to about 100%.

Polytetrafluoroethylene powder (PTFE) is mixed with the lead powder in an amount of from about 0.1 to 3, preferably from about 0.2 to 0.5, percent by weight.

The mixture is then heated to an elevated temperature and the heated mixture is then treated by applying shear stresses thereto so that a substantial portion of the PFTE is converted into fibers in the mixture. The mixture is generally heated to a temperature of about 80° C. The shear stresses may be applied by any suitable means such as, for example, by disposing the heated powder mixture between the walls of a rotating drum and a rotating cylinder for a time sufficient to form the PTFE into fibrous form by application of shear stresses.

The resulting powder mixture is suitable for use in the filling of tube electrodes by the dry powder process set forth above with an elimination or at least substantial reduction of the dust binding problem.

The invention is additionally illustrated in connection with the following Example which is to be considered as illustrative of the present invention. It should be understood, however, that the invention is not limited to the specific details of the Example.

EXAMPLE

Conventional lead dust powder as used in the dry filling of tube electrodes for lead storage batteries is mixed with 0.2% of PTFE of the trade name Teflon K. The mixing is carried out in a mixer which consisted of a rotating drum with a similar rotating cylinder in contact with the inside of the cylindrical wall. The drum's rotation speed is about 50 rpm and the mixing time is 5 minutes. The mixture is then heated to about 80° C and treated again in the mixer for about 10 minutes, during which time the rotation speed is about 40 rpm. For comparison's sake lead powder is treated in the same way without the addition of PTFE. The two powders are then filled in tube electrodes using the dry powder filling process as set forth above. A considerable reduction of the dust binding is observed for the dust treated with PFTE. No difference is observed in the capacity of the electrodes made with the two types of lead powder used.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

I claim:

1. In a process for the production of tube electrodes for use in lead storage batteries wherein a sheath is provided about a conductive rod and a dry lead powder is introduced between the sheath and the rod, the improvement which comprises making the lead powder by forming a mixture of lead powder which normally is at least 70% oxidized and from 0.1 to 3 percent by weight of polytetrafluoroethylene, heating the mixture and applying shear stresses to said powder mixture sufficient to convert a substantial portion of said polytetrofluoroethylene into fibrous form.

2. In the process of claim 1 wherein the amount of polytetrafluoroethylene is 0.2 to 0.5 percent by weight.

* * * * *